(12) United States Patent
Nakata et al.

(10) Patent No.: US 7,208,061 B2
(45) Date of Patent: Apr. 24, 2007

(54) RAW TIRE FORMING APPARATUS AND RAW TIRE FORMING METHOD

(75) Inventors: Norikatsu Nakata, Kobe (JP); Akio Hakamada, Kobe (JP); Yutaka Yoshida, Kobe (JP)

(73) Assignee: Sumitomo Rubber Industries, Ltd., Kobe-shi (JP)

(*) Notice: Subject to any disclaimer, the term of this patent is extended or adjusted under 35 U.S.C. 154(b) by 126 days.

(21) Appl. No.: 10/873,208

(22) Filed: Jun. 23, 2004

(65) Prior Publication Data

US 2004/0261934 A1 Dec. 30, 2004

(30) Foreign Application Priority Data

Jun. 24, 2003 (JP) ............... 2003-179992

(51) Int. Cl.
*B29D 30/26* (2006.01)
*B29D 30/28* (2006.01)

(52) U.S. Cl. ............. 156/126; 156/130.3; 156/406.2

(58) Field of Classification Search .......... 156/126, 156/127, 130.3, 406.2, 412
See application file for complete search history.

(56) References Cited

U.S. PATENT DOCUMENTS 3,947,312 A * 3/1976 Henley ............. 156/415
4,039,366 A * 8/1977 Yabe ............. 156/406.2
4,178,198 A * 12/1979 Kent ............. 156/96

FOREIGN PATENT DOCUMENTS

| GB | 1147134 | * | 4/1969 |
| JP | 60-132745 A | | 7/1985 |
| JP | 2003-71947 A | | 3/2003 |
| JP | 2003-71948 A | | 3/2003 |

* cited by examiner

*Primary Examiner*—Geoffrey L. Knable
(74) *Attorney, Agent, or Firm*—Birch, Stewart, Kolasch & Birch, LLP

(57) ABSTRACT

It is an object of the present invention to precisely and efficiently paste a tread ring and a raw tire base body with each other. A ring-like base body 5 is aligned with a former 3. The ring-like base body 5 relatively approaches and separates from a former 3. The ring-like base body 5 includes pasting means 6 which pastes a tread ring A to a raw tire base body B. The pasting means 6 includes a grasping tool 11 having a plurality of segments 13 which abut against an outer peripheral surface of the tread ring A to grasp the tread ring A. The pasting means 6 also includes a pushing-down pasting tool 12 having an annular rubber tube body 15. The rubber tube body 15 is disposed on each side of the segment 13 and pushes down a shoulder side portion As of the tread ring A by expansion to paste the shoulder side portion As to the raw tire base body B.

7 Claims, 7 Drawing Sheets

RAW TIRE FORMING APPARATUS AND RAW TIRE FORMING METHOD

This Nonprovisional application claims priority under 35 U.S.C. § 119(a) on Patent Application No(s). 2003-179992 filed in Japan on Jun. 24, 2003, the entire contents of which are hereby incorporated by reference.

BACKGROUND OF THE INVENTION

1. Field of the Invention

The present invention relates to a raw tire forming apparatus and a raw tire forming method capable of precisely and efficiently pasting a tread ring to a raw tire base body, enhancing the uniformity of a finished tire and enhancing the productivity.

2. Prior Art

As shown in FIG. 7, in a producing step of a raw tire (tire before vulcanization) in a radial tire, it is necessary to paste a cylindrical tread ring A to a raw tire base body B which is expanded in a toroidal shape. According to a normal pasting method, a rotatable disk e which is called a tread stitcher is pushed against the tread ring A, the raw tire base body B is rotated and in this state, the disk e is gradually moved outward in the axial direction of the tire and inward in the radial direction, thereby pasting the entire tread ring A.

In the stitching method using the disk e, the carcass cord is deviated from the radial direction by twist caused by rotation torque, an angle in the lateral direction is different in the belt cord, and the uniformity of a finished tire is adversely influenced. Since the shoulder side portion of the tread ring A is gradually pushed down, it takes time for pasting the tread ring A, and the productivity of the raw tire is deteriorated.

Solutions of this problem have been proposed in patent document 1 (Japanese Patent Application Laid-open No. S60-132745), patent document 2 (Japanese Patent Application Laid-open No. 2003-71947) and patent document 3 (Japanese Patent Application Laid-open No. 2003-71948).

According to the patent document 1, however, a wide tread ring integrally provided with a sidewall rubber is used to prevent a tread edge from becoming cracked. Thus, it is necessary to crimp a wide region in the vicinity of the bead portion. Therefore, it is necessary to increase the expansion coefficient of the tube bladder, but if the expansion coefficient is increased, a large difference is prone to be generated in the expansion coefficient on the circumference, and the pasting operation can not be carried out uniformly in some cases.

In the patent document 2, since the bladder is held by a cramp member, concentric severity is high because of positional relation between the clamp body and a raw tire base body. Thus, even if there is a small deviation in concentric state, variation is generated in the cramping force, the tread edge meanders and the quality is adversely affected. Since the center of the bladder is deviated toward the tread with respect to the center of the clamp member, there is an adverse possibility that air remains below the tread ring.

In the patent document 3, since the rigidity is changed depending upon a portion of the tube, it is necessary to enhance the precision of a part of the tube and to precisely control the position where the tread ring starts abutting. Thus, it is important to form the tube precisely and to perform a high level maintenance. Since the clamp is fixed, there is a problem that concentric severity is high like the patent document 2.

In any of the patent documents 1 to 3, the step for moving the pasting apparatus to a predetermined position to crimp after the tread ring is transferred to the raw tire base body requires the same installation space and the cycle time of step as those of the conventional technique like the conventional disk.

SUMMARY OF THE INVENTION

It is an object of the present invention to provide a raw tire forming apparatus and a raw tire forming method capable of precisely and efficiently paste a tread ring to a raw tire base body while reducing the installation space and step cycle time without requiring high precision of the rubber tube body itself and of the mounting operation of the rubber tube body.

To achieve the above object, claim 1 provides a raw tire forming apparatus in which a position of a tread ring including a belt ply and a tread rubber is aligned with an outer periphery of a raw tire base body on a former in which tire members including a carcass ply are combined and the tread ring is transferred into the apparatus, the raw tire base body is expanded from its cylindrical shape to its toroidal shape, the tread ring is pushed against the toroidal raw tire base body, and the raw tire forming apparatus includes pasting means for pasting an inner peripheral surface of the tread ring to the raw tire base body, wherein the pasting means includes a ring-like base body which moves concentrically and relatively with the former in an axial direction of the tire, the ring-like base body includes a grasping tool having a plurality of segments capable of advancing and retracting in a radial direction, the segments capable of abutting against an outer peripheral surface of the tread ring to grasp the tread ring by advancing inward of an inner surface of the ring-like base body, and a pushing-down pasting tool having an annular rubber tube body disposed on each side of the segment, the segments expanding by charging an internal pressure to push down a shoulder side portion of the tread ring, thereby pasting the shoulder side portion on the toroidal raw tire base body.

Claim 5 provides a raw tire producing method for pasting an inner peripheral surface of a tread ring including a belt ply and a tread rubber to an outer peripheral surface of a raw tire base body in which a tire member including a carcass ply is combined and which expands from its cylindrical shape into its toroidal shape on a former, wherein the method comprises a grasping step for grasping the tread ring by a grasping tool provided on a ring-like base body which relatively moves concentrically with the former in the axial direction of he tire, a positioning step for positioning the grasped tread ring with respect to the raw tire base body on the former by relative movement by the ring-like base body, an expanding step for pushing and pasting the raw tire base body to and against a central portion of the grasped tread ring by expanding the raw tire base body on the former from its cylindrical shape into its toroidal shape by charging an internal pressure, and a pasting step for pushing down a shoulder side portion of the tread ring by the rubber tube body which is disposed on each side of the segment and which are expanded by charging an internal pressure, and for pasting the shoulder side portion to the toroidal raw tire base body.

DESCRIPTION OF THE PREFERRED EMBODIMENTS

An embodiment of the present invention will be explained with reference to the drawings.

Figure 1:
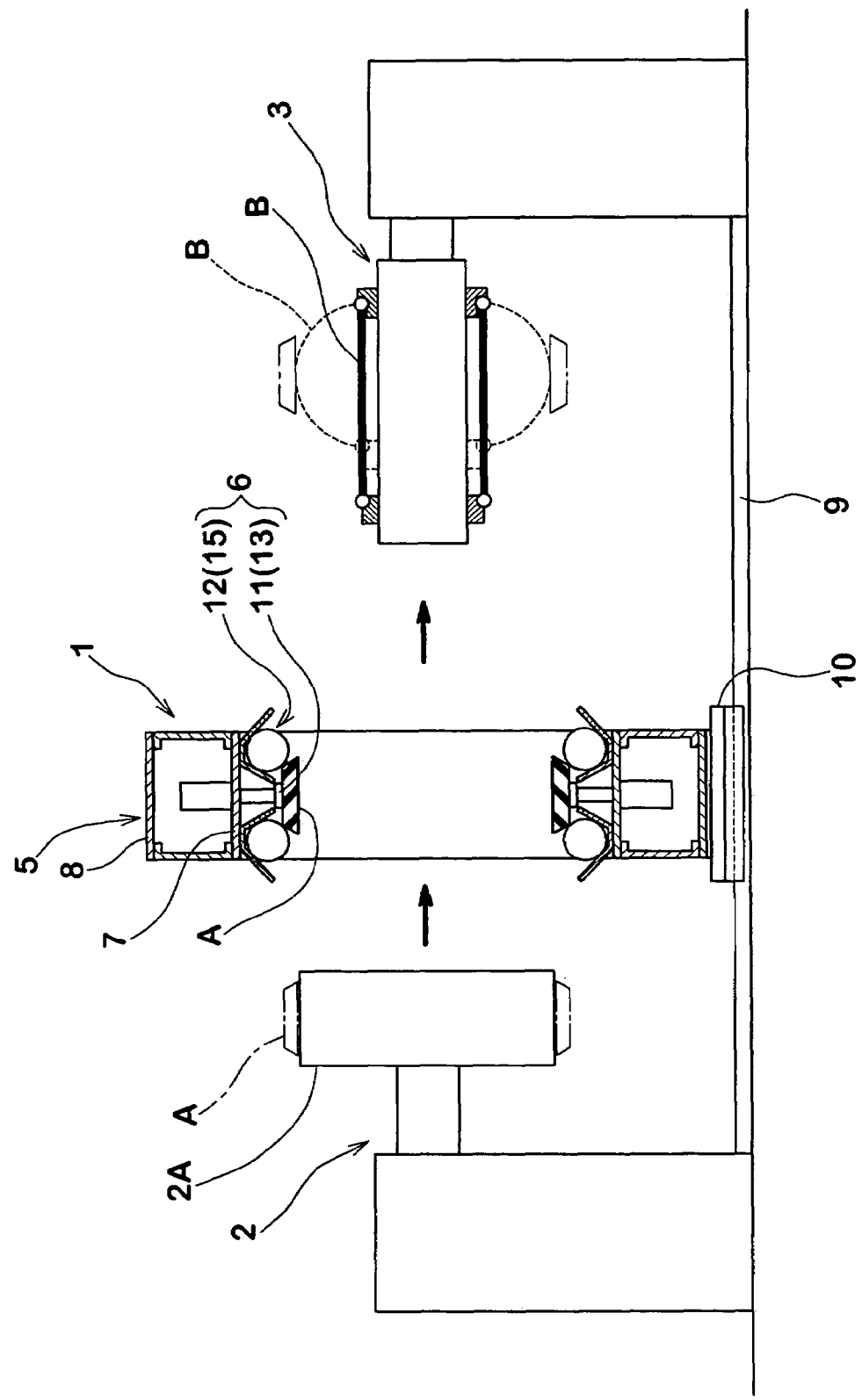
FIG. 1 is a side view showing an embodiment of a raw tire forming apparatus of the present invention.
Figure 2:
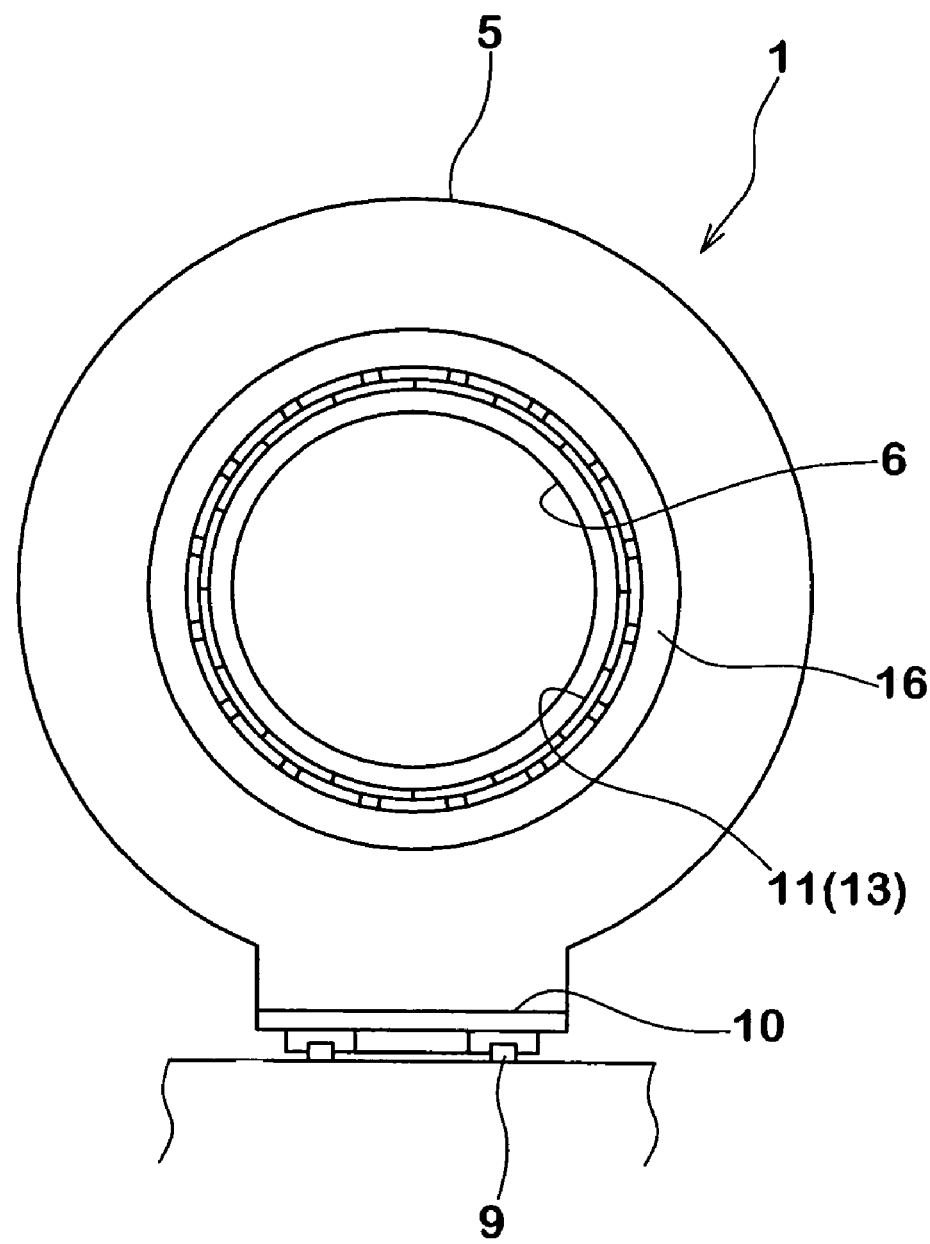
FIG. 2 is a front view thereof.

FIG. 1 shows a raw tire forming apparatus 1 of the present invention. The raw tire forming apparatus 1 is disposed between a tread ring forming drum 2 which forms a tread ring A, and a former 3 which expands a raw tire base body B from its cylindrical shape into a toroidal shape.

The raw tire forming apparatus 1 transfers the tread ring A received from the tread ring forming drum 2 onto the former 3 while aligning the tread ring A with an outer periphery of the raw tire base body B on the former 3. The raw tire forming apparatus 1 also pushes an inner peripheral surface of the tread ring A against the toroidal raw tire base body B and pastes the same. That is, the raw tire forming apparatus 1 of the present invention functions as a transfer which transfers the tread ring and as a stitcher for pasting the tread ring. Thus, the conventional special pasting apparatus can be eliminated and the installation space can effectively be utilized.

Here, the tread ring forming drum 2 is of a known structure having a rotatable drum whose diameter can be reduced. A tread constituent member including a belt ply a1 and a tread rubber a2 is wound on the drum 2A, thereby forming the annular tread ring A (shown in FIG. 6(A)).

In this embodiment, the former 3 is a single former of a known structure used in a so-called single stage forming method. A tire member including a carcass ply b1 is wound in sequence, and a cylindrical raw tire base body B (shown in FIG. 6(B)) is formed. In the drawings, reference number b2 represents an inner linear rubber, reference number b3 represents a bead core, reference number b4 represents a bead apex rubber, and reference number b5 represents a sidewall rubber. The former 3 may be a second former used in a two stage forming method. In such a case, a raw tire base body B which is separately formed on the first former is provided on the former 3.

Next, the raw tire forming apparatus 1 includes a ring-like base body 5 which moves between the tread ring forming drum 2 and the former 3 which are concentrically disposed, and a pasting means 6 supported by this ring-like base body 5 as shown in FIG. 1. The pasting means 6 includes a grasping tool 11 capable of grasping the tread ring A, and a pushing-down pasting tool 12 which pushes down the tread ring shoulder side portion As and pastes the same on the toroidal raw tire base body B.

In this embodiment, the ring-like base body 5 is an annular body which is concentric with the former 3. The ring-like base body 5 has a rectangular cross section comprising an inner peripheral plate portion 7 and an outer peripheral plate portion 8 connected with each other through side plates. The ring-like base body 5 is provided at its lower end with a running-stage 10 which can run along rails 9 provided between the tread ring forming drum 2 and the former 3. Thus, the ring-like base body 5 can relatively move with respect to the former 3 in an axial direction of the tire.

The grasping tool 11 includes a plurality of segments 13 which can move forward and backward in a radial direction. If the segments 13 move forward, i.e., inward of an inner surface of the ring-like base body 5, the segments 13 abut against the outer peripheral surface of the tread ring A and grasp the tread ring A. Although the segments 13 are supported by a rod end of a cylinder 14 fixed to the inner peripheral plate portion 7 in this embodiment, the segments 13 may be supported by any of known diameter-reducing mechanism such that the segments 13 can move while reducing the diameter.

Figure 3:
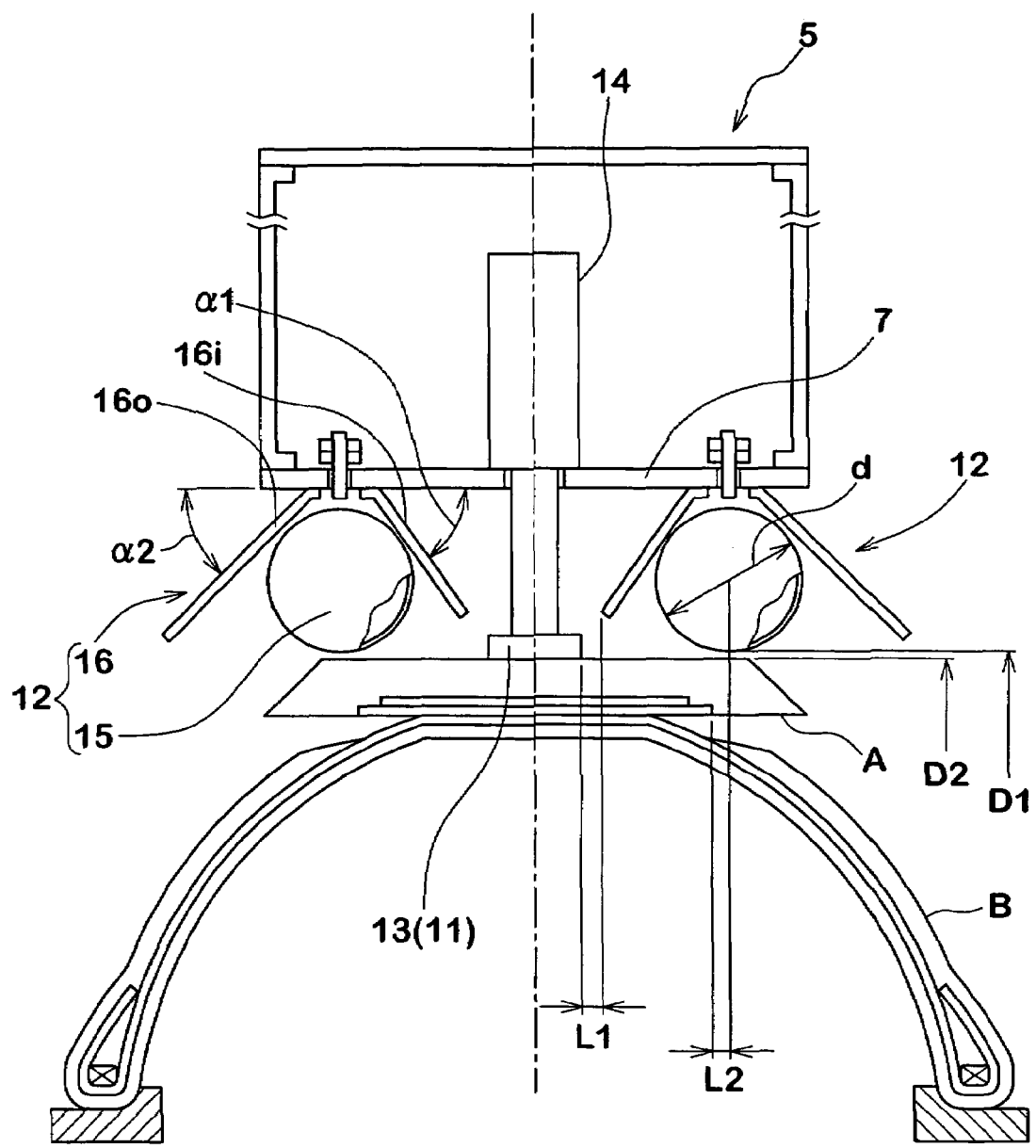
FIG. 3 is an enlarged sectional view of a pasting means.

Next, the pushing-down pasting tool 12 includes an expandable annular rubber tube body 15 disposed on each side of the segment 13 as shown in FIG. 3. In this embodiment, the pushing-down pasting tool 12 includes a guide tool 16 which guides the expansion of the rubber tube body 15.

Each rubber tube body 15 is a soft annular body having a circular cross section and a rubber thickness of 1 to 4 mm. The rubber tube body 15 continuously extends in a circumferential direction of the tire. As shown in FIG. 5(A), 2 to 5 bolt-like mounting hardware 20 including air valves 20A are projecting from an outer peripheral edge of the rubber tube body 15 at distances from one another in the circumferential direction. The mounting hardware 20 other than the air valves 20A is fixed to the rubber tube body 15 by welding or the like. As shown in FIG. 5(B), the mounting hardware 20 is mounted on the ring-like base body 5 with play therebetween using a double nut or the like.

Figure 5B:
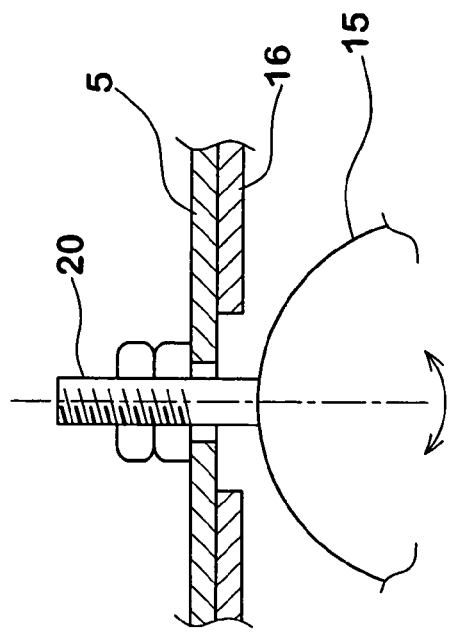
FIG. 5(B) is a diagram showing one example of a mounting state of the rubber tube body.
Figure 5C:
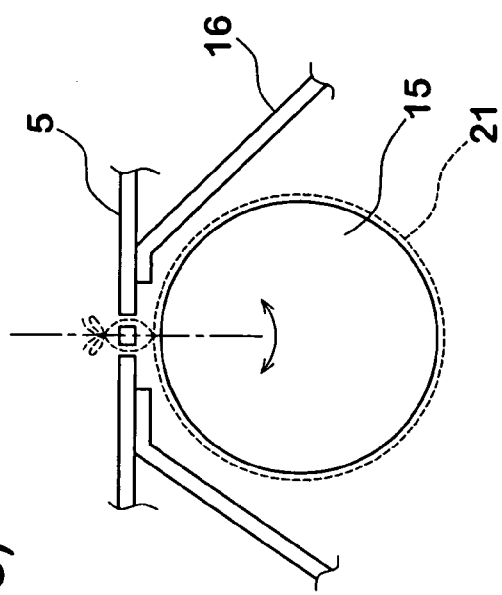
FIG. 5(C) is a diagram showing another example of the mounting state.
Figure 5A:
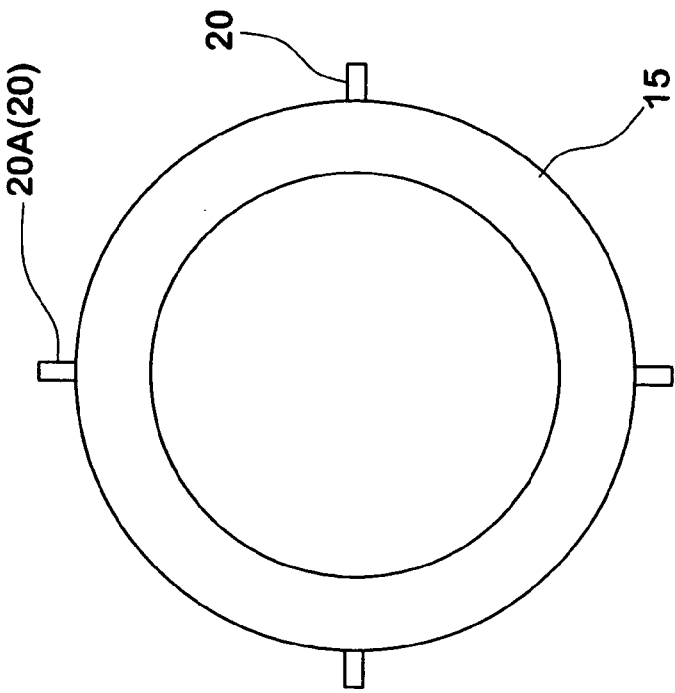
FIG. 5(A) is a front view of a rubber tube body.

As another mounting method, as shown in FIG. 5(C), the mounting hardware 20 other than the air valve 20A maybe fastened using a rubber band-like fastening cord 21 with play with respect to the ring-like base body 5. In that case, the fastening cord 21 is preferably easily expandable and has lower elasticity than the rubber tube body 15. In any cases, the rubber tube body 15 is supported at a point, and the rubber tube body 15 is mounted such that it can inclined around the supporting point by play and it can easily be deviated in position.

As shown in FIG. 3, the guide tool 16 is formed into a V-shape having an inner guide piece 16i and an guide piece 16o each extending in the circumferential direction on each side of the rubber tube body 15. The inner and outer guide pieces 16i and 16o incline in directions from radially outside to inside such as to separate away from the rubber tube body 15. At that time, it is preferable that an inclination angle α1 between the inner guide piece 16i and the axial direction of the tire is in a range of 50 to 90°, an inclination angle α2 between the outer guide piece 16o and the axial direction of the tire is in a range of 30 to 70° and is equal to or smaller than the inclination angle α1, and the guide tool 16 guides such that the rubber tube body 15 expands outward as possible in the axial direction of the tire.

At the position of the tread ring forming drum 2, the segments 13 of the raw tire forming apparatus 1 are allowed to advance radially inward and to abut against the outer peripheral surface of the tread ring A on the tread ring forming drum 2. With this, the tread ring A is received from the tread ring forming drum 2 and grasped (grasping step).

When the tread ring A is received, the tread ring forming drum 2 reduces its diameter to release the tread ring A.

Then, the raw tire forming apparatus 1 is allowed to move to a predetermined position of the former 3 along the rails 9, and the grasped tread ring A is aligned with the raw tire base body B on the former 3 (aligning step). In this state, the raw tire base body B on the former 3 is expanded from its cylindrical shape into the toroidal shape by charging the internal pressure. At that time, as shown in FIG. 3, a central portion of the grasped tread ring A comes into contact with a central portion of the toroidal raw tire base body B under pressure and is pasted (expansion step).

Figure 4:
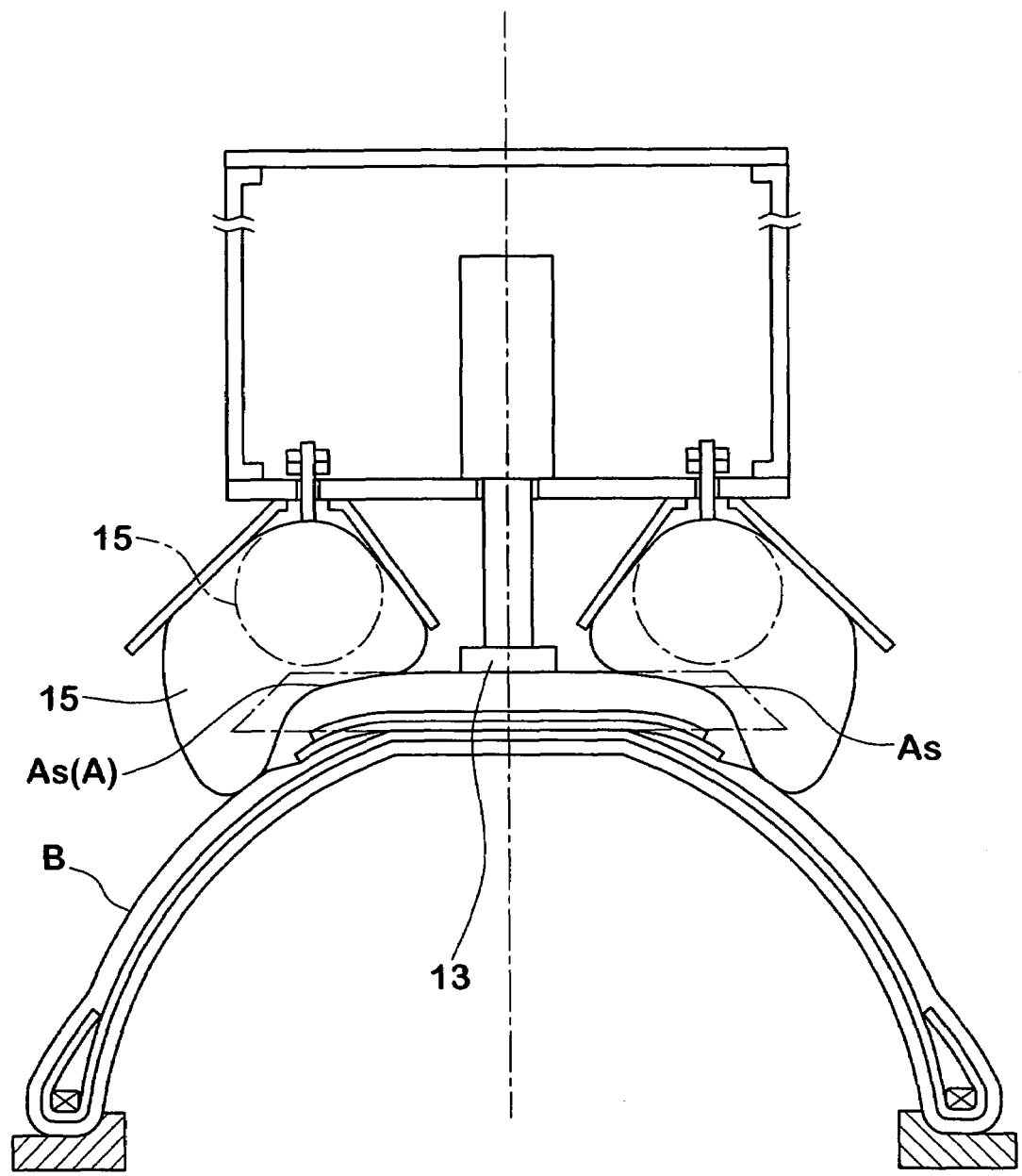
FIG. 4 is a sectional view of an operating state of the pasting means.

Thereafter, the diameter-reduced state of the segment 13 is maintained, and in this state, the internal pressure is charged into the rubber tube body 15 of the pushing-down pasting tool 12, thereby largely expanding the rubber tube body 15 as shown in FIG. 4. With this, the tread ring shoulder side portion As is pushed down and is pasted on the raw tire base body B (pasting step). At that time, the expansion of the rubber tube body 15 is limited and guided by the inner and outer guide pieces 16i and 16o.

Here, a bladder, a rubber tube and the like are made of rubber. Therefore, when it expands from its weak (thin) film portion and it naturally expands eccentrically. This eccentrically or unevenly expanded portion first pushes the tread ring or strongly pushes the tread ring. At that time, if a reinforcing layer or the like is inserted into the rubber tube and fixed without play, since a side of the rubber tube is deformed easily and a force can not be released, and the tread ring is pushed unevenly, the tread edge portion meanders and the uniformity is adversely affected.

In this embodiment, the rubber tube body 15 is mounted with play so that the rubber tube body 15 can easily be deviated in position. Thus, when the unevenly expanded portion is generated and such portion tries to come into strong contact with the tread ring A, the rubber tube body 15 itself moves (changes its attitude) and the uneven force can be released. That is, even when stress variation in the circumferential direction or radial direction is generated in the rubber tube body 15 in some cases, the rubber tube body 15 itself moves to release the force as it is expanded, the reaction force allows it to be centered automatically with respect to the tread ring A, and the auto-correcting function can be exhibited.

Therefore, the pushing-down pasting tool 12 can precisely paste the tread ring A and the raw tire base body B with high quality. Further, the rubber tube body 15 does not require high part precision and assembling precision, and there is a merit that a shape and a structure having a simple circular cross section can be employed as the rubber tube body 15. The pushing-down pasting tool 12 expands the rubber tube body 15 while pushing the central portion of the tread ring A by the segments 13. Therefore, air below the tread ring A can be released toward the tread edge, and it is possible to reliably discharge the remaining air from the entire region including the central portion. Since the pasting operation can be carried out simultaneously with the transfer of the tread ring A into the raw tire base body B, the operation time can be largely reduced, and also the step cycle time can be reduced largely.

As shown in FIG. 3, a distance L1 in the axial direction of the tire between the segment 13 and a tip end of the inner guide piece 16i is preferably greater than 0 mm and equal to or smaller than 10 mm. If the distance L1 is 0 mm or less, when the segment 13 advances or retreats, it collides against the inner guide piece 16i. If the distance L1 exceeds 10 mm, there is an adverse possibility that air remains in this distance L1.

Figure 6A:
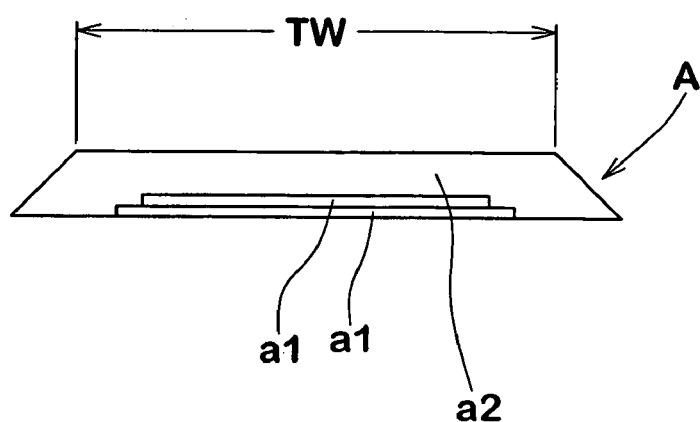
FIGS. 6(A) and (B) are schematic sectional views of a tread ring and a raw tire base body.
Figure 6B:
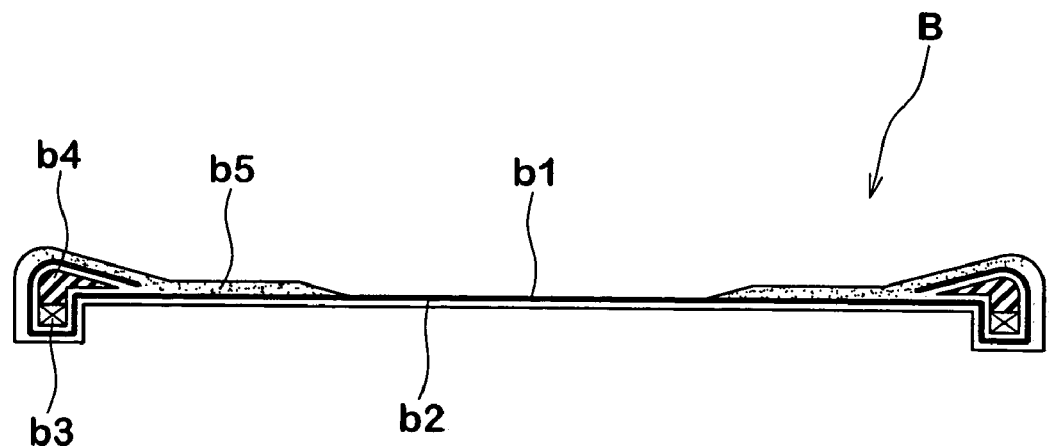

In a standard state in which 1 atmospheric pressure is charged into the rubber tube body 15, the cross section thereof is substantially circular in shape, the cross section diameter d of the rubber tube body 15 is preferably in a range of 25 to 100% of the tread width TW of the tread ring A (shown in FIG. 6(A)), and a distance L2 in the axial direction of the tire between the cross section center and an outer end of the widest belt ply a1 is preferably in a range of −5 to +10 mm (outer side from the outer end in the axial direction of the tire is +). If the cross section diameter d is smaller than −25% and if the distance L2 is smaller than −5 mm, a rubber tube body 15 having a large expansion coefficient is required for pasting it up to the tread edge, the endurance strength of the rubber tube body 15 is lowered, and it takes time to charge the pressure. If the cross section diameter d exceeds 100%, the apparatus is increased in size, the installation space can not be utilized effectively, and it takes time to charge the pressure. If the distance L2 exceeds +10 mm, air is prone to remain in the tread ring shoulder side portion As. When the cross section diameter d is not a perfect circle, a diameter of the smallest perfect circle in a perfect circle capable of surrounding the cross section of the rubber tube body 15 (except air valve) is defined as the cross section diameter d.

In this standard state, the inner diameter D1 of the rubber tube body 15 is preferably in a range of 100 to 110% of the outer diameter D2 of the tread ring A. If the inner diameter D1 exceeds 110% of the outer diameter D2, a rubber tube body 15 having a large expansion coefficient is required, the endurance strength of the rubber tube body 15 is lowered, and it takes time to charge the pressure.

A charging internal pressure P1 of the rubber tube body 15 is preferably 20 to 95% of a charging internal pressure P2 of the raw tire base body B, and more preferably 30 to 80%. If the charging internal pressure P1 is smaller than 20% of the charging internal pressure P2, the pushing-down force of the tread ring shoulder side portion As is insufficient, or the pushing-down force against the raw tire base body B is insufficient, and there is an adverse possibility that the pasting operation can not be carried out reliably. If the charging internal pressure P1 exceeds 95% of the charging internal pressure P2, the raw tire base body B is deformed or the like when the pasting operation is carried out.

Figure 7:
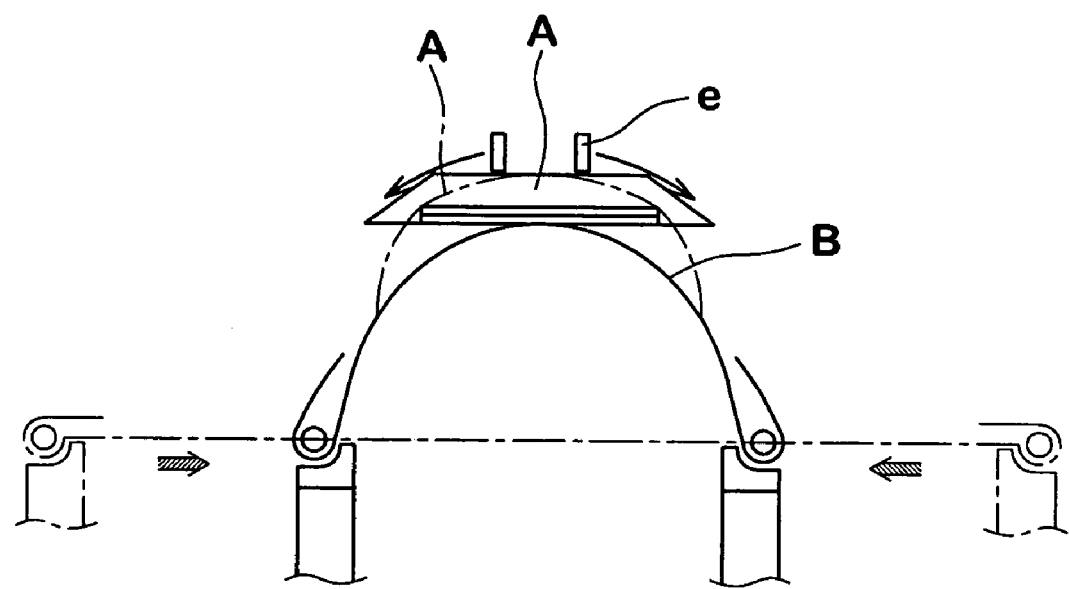
FIG. 7 is a diagram for explaining a conventional technique.

In this invention, the charging internal pressure P2 of the raw tire base body B can be reduced to about 30 to 80% (e.g., 42 to 112 kPa) of the conventional stitching system (shown in FIG. 7) using a disk e. Thus, deformation of the raw tire base body B caused by this charging internal pressure P2 can be suppressed.

In the case of the conventional stitching system, the charging internal pressure P2 of the raw tire base body B is usually set to a value as high as about 140 kPa, and the pushing force of the disk 3 is set to a value as high as about 140 kPa. This is because that if the charging internal pressure P2 is lower than P3, the raw tire base body B is pushed by the disk e and is deformed inward. If the pushing force P3 is 140 kPa or lower, a crimping force becomes excessively weak, the tread ring jumps and returns and the pasting operation can not be carried out. To prevent this, it is necessary to extremely reduce the rotation speed of the raw tire base body B, and the operation efficiency is largely lowered. Thus, the charging internal pressure is set to the high pressure.

In this embodiment, however, the raw tire base body B is not rotated and pushed on the circumference at a dash and thus, it is possible to push strongly within sufficient crimping time. Therefore, the charging internal pressure P1 of the rubber tube body 15 can be set to a low value while reliably carrying out the pasting operation, and the charging internal pressure P2 of the raw tire base body B can also be reduced.

Although the especially preferred embodiment of the present invention has been described in detail, the invention is not limited to the embodiment, and the invention can variously be modified.

EXAMPLE

Ten raw tires in which tread rings and raw tire base bodies are pasted on each other were formed using the conventional stitching apparatus (FIG. 7) using the raw tire forming apparatus and the disk e of the present invention shown in FIG. 1, the raw tires were vulcanized and formed, the uniformity (RFV, LFV), air remaining state under the tread ring, and the pasting operation time of the finished tires (size of 145/65R13) were compared, and result thereof are shown in Table 1. The specifications other than the pasting methods of the tread rings in the examples of the present tires and the conventional tires are the same. The specification of the raw tire forming apparatus is shown in Table 2.

(1) Uniformity:

In accordance with JASOC607, RFV (radial force variation) and LFV (lateral force variation) of the ten prototyped tires were measured under the conditions of rim of 13×4.5J, internal pressure of 200 kPa and a load of 2.4 kN, and the average values thereof were indicated with indices where a comparative example is 100. A lower index shows more excellent uniformity.

(2) Air Remaining State:

The completed or finished tire was disassembled, and the presence or absence of remaining air was visually checked.

TABLE 1

(PS3568)

|  | Conventional Example | Present Example |
|---|---|---|
| Charging internal pressure P2 (Kpa) of raw tire base body | 140 | 80 |
| Charging internal pressure P1 (Kpa) of rubber tube body | — | 50 |
| Pressing force P3 (Kpa) of disk | 140 | — |
| Pasting operation time (second) | 10 | 5 |
| Uniformity |  |  |
| RFV | 100 | 87 |
| LFV | 100 | 44 |
| Air remaining state | 0 | 0 |

TABLE 2

(PS3568)

| Rubber tube body | |
|---|---|
| Rubber thickness (mm) | 1.5 |
| Cross section diameter d (mm) | 62 |
| (radio d/TW) | 85% |
| Inner diameter D1 (mm) | 505 |
| (radio D1/D2) | 103% |
| Distance L2 (mm) | 5 |

TABLE 2-continued (PS3568)

| Guide tool | |
|---|---|
| Inclination angle α1 (°) | 55 |
| Inclination angle α2 (°) | 45 |
| Distance L1 (mm) | 5 |

*Tread width TW is 146 mm.
Outer diameter D2 of tread ring is 488 m.

As described above, since the present invention has both the transfer function of the tread ring and the stitcher function, the installation space can effectively be utilized, and the transfer operation and the pasting operation of the tread ring can be carried out at the same time. Therefore, the step cycle time can largely be reduced. It is unnecessary to pay much attention to misalignment, eccentricity and uneven expansion of the rubber tube, the pasting operation between the tread ring and the raw tire base body can be carried out precisely with high quality without requiring high precision of parts of the rubber tube body itself and high assembling precision. It is possible to prevent air from remaining in the entire region under the tread ring.

What is claimed is:

1. A method for producing a raw tire comprising:
   a grasping step for grasping a tread ring including a belt ply and a tread rubber by a grasping tool comprising a plurality of segments and provided in an annular base body which is able to move concentrically with a former in the axial direction of the tire,
   a step for forming a cylindrical raw tire base body by assembling tire members including a carcass ply on the former,
   a positioning step for positioning the grasped tread ring with respect to the raw tire base body on the former by relative movement between the annular base body and the former,
   an expanding step for pushing and pasting the raw tire base body to and against a central portion of the grasped tread ring by expanding the raw tire base body on the former from its cylindrical shape into its toroidal shape by applying an internal pressure to the cylindrical raw tire base body, and
   a pasting step for pasting the inner peripheral surface of the tread ring to the outer peripheral surface of the toroidal raw tire base body by expanding annular rubber tube bodies extending in the circumferential direction of the tire which are disposed on each side of the grasping tool by application of an internal pressure to the rubber tube bodies, thereby pushing down shoulder side portions of the tread ring so as to paste the tread ring to the toroidal raw tire base body by direct contact with the expanded annular rubber tube bodies, wherein each of the annular rubber tube bodies is attached to the annular base body with play so as to be able to deviate in position, and each of the annular rubber tube bodies has a substantially circular cross section having a diameter of 25 to 100% of the tread width of the tread ring when an inner pressure of 1 atm is applied thereto.

2. The method according to claim 1, wherein each of the rubber tube bodies expands while being guided by an inner guide piece and an outer guide piece which extend in the circumferential direction of the tire at axially inside and outside of each of the rubber tube bodies.

3. The method according to claim 1 or 2, wherein the internal pressure of the rubber tube bodies is 20 to 95% of the internal pressure of the raw tire base body.

4. The method according to claim 2, wherein the inner and outer guide pieces are disposed to form a V-shape in cross section such that the distance between them increases toward the radially inward, thereby limiting expansion of each rubber tube body in the axially inward and outward directions.

5. The method according to claim 4, wherein an inclination angle $\alpha 2$ of the outer guide piece to the axial direction is smaller than an inclination angle $\alpha 1$ of the inner guide piece to the axial direction.

6. The method according to claim 1, wherein the distance in the axial direction of the tire between the center of the substantially circular cross section of each rubber tube body and the axially outer end of the widest belt ply is from −5 to +10 mm.

7. The method according to claim 1, wherein each of the annular rubber tube bodies is supported by the annular base body with play so as to be able to deviate in position through mounting hardware including an air valve.

* * * * *